(12) United States Patent
Dorschner et al.

(10) Patent No.: US 6,704,474 B1
(45) Date of Patent: Mar. 9, 2004

(54) OPTICAL BEAM STEERING SYSTEM

(75) Inventors: Terry A. Dorschner, Marlborough, MA (US); Lawrence J. Friedman, Lexington, MA (US); Douglas S. Hobbs, Lexington, MA (US); L. Q. Lambert, Jr., Tucson, AZ (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/215,268

(22) Filed: Aug. 8, 2002

Related U.S. Application Data

(62) Division of application No. 09/299,794, filed on Apr. 26, 1999, now abandoned, which is a division of application No. 08/813,528, filed on Mar. 7, 1997, now Pat. No. 5,963,682, which is a continuation of application No. 08/247,948, filed on May 24, 1994, now abandoned.

(51) Int. Cl.$^7$ ............................................. G02B 6/26
(52) U.S. Cl. ............................... 385/17; 385/16; 385/18; 385/20; 349/159
(58) Field of Search ............................ 385/8, 9, 16, 17, 385/20, 21, 22; 349/196, 197

(56) References Cited

U.S. PATENT DOCUMENTS

| | | | |
|---|---|---|---|
| 4,201,442 A | 5/1980 | McMahon et al. | 385/17 |
| 4,278,327 A | 7/1981 | McMahon et al. | 385/20 |
| 4,385,799 A | 5/1983 | Soref | 385/17 |
| 4,478,494 A | 10/1984 | Soref | 385/8 |
| 4,720,171 A | 1/1988 | Baker | 359/42 |
| 4,720,172 A | 1/1988 | Baker | 359/42 |
| 4,737,019 A | 4/1988 | Baker | 359/42 |
| 4,836,657 A | 6/1989 | Gunji et al. | 359/38 |
| 4,856,863 A | 8/1989 | Sampsell et al. | 385/17 X |
| 4,882,235 A | 11/1989 | Resler | 428/642 |
| 4,964,701 A | 10/1990 | Dorschner et al. | 350/336 |
| 4,988,157 A | 1/1991 | Jackel et al. | 385/17 |
| 5,018,835 A | 5/1991 | Dorschner | 350/336 |
| 5,093,747 A | 3/1992 | Dorschner | 359/316 |
| 5,126,869 A | 6/1992 | Lipchak et al. | 359/94 |
| 5,299,054 A | 3/1994 | Geiger | 385/17 X |
| 5,373,393 A | 12/1994 | DeJule et al. | 359/42 |
| 5,440,654 A | 8/1995 | Lambert, Jr. | 385/17 |
| 5,539,543 A | * 7/1996 | Liu et al. | 359/15 |

FOREIGN PATENT DOCUMENTS

| | | |
|---|---|---|
| JP | 2-46431 | 2/1990 |
| JP | 07-092507 | * 4/1995 |

OTHER PUBLICATIONS

Damman, H. et al.; "High–Efficiency In–Line Multiple Imaging By Means of Multiple Phase Holograms", Optics Communications, Jul. 1971, pp. 312–315.

Mait, J.; "Design of Binary–Phase and Multiphase Fourier Gratings for Array Generation", J. Opt. Soc. Am. A, vol. 7, no. 8, Aug. 1990, pp. 1514–1528.

Paparao, P. et al.; "Generation of Reconfigurable Interconnections with a Two–Dimensional Acousto–Optic Deflector", Applied Optics, vol. 33, No. 11, Apr. 10, 1994, pp. 2140–2146.

* cited by examiner

*Primary Examiner*—Hung N. Ngo
(74) *Attorney, Agent, or Firm*—Daly, Crowley & Mofford, LLP

(57) ABSTRACT

A data communication system comprising a plurality of fiber optic cables and a fiber optic switching system, comprising: a support structure for securing light emitting/light receiving ends of the plurality of fiber optic cables in predetermined positions; and, means for re-directing light emitted from the light emitting/light receiving end of one of the fiber optic cables to the light emitting/light receiving ends of one, or more than one, of a plurality of the plurality of fiber optic cables. The re-directing means includes means for collimating and directing the light emitted from the end of one of the cables as a beam propagating along a predetermined direction and for re-directing the beam towards the end of another one of the cables selectively in accordance with an electrical signal. More particularly, the re-directing means includes electro-optical phase shifting medium, preferably liquid crystal molecules.

41 Claims, 4 Drawing Sheets

OPTICAL BEAM STEERING SYSTEM

CROSS REFERENCE TO RELATED CASES

This is a divisional application of (and claims the benefit of priority under 35 U.S.C 120) Ser. No., 09/299,794, filed Apr. 26, 1999 now abandoned which is a divisional of application Ser. No. 08/813,528 filed Mar. 7, 1997 now U.S. Pat. No. 5,963,682 which is a continuation of U.S. application Ser. No. 08/247,948 filed May 24, 1994, which is abandoned. This application incorporates by reference application Ser. No. 08/175,994, "Fiber Optic Switching network", inventor L. Q. Lambert, filed Dec. 30, 1993, assigned to the same assignee as the present invention, now U.S. Pat. No. 5,440,654 issued Aug. 8, 1995.

BACKGROUND OF THE INVENTION

This invention relates generally to optical beam steering systems and also to data communications systems having fiber optic switching systems.

As is known in the art, fiber optics are being used in a wide variety of applications. One application is in the area of data communication systems. In such application, data, in the form of modulations of laser produced light, is transmitted to, and received from, a plurality of terminals through fiber optic cables. A switching network is provided to selectively direct the data to, and from, the terminals. Typically, the switching network converts light emitted by a transmitting one of the terminals into corresponding electrical signals. The electrical signals are directed to a selected output port of the switching network by electrical circuitry in the switching network. The electrical signals at the output port are converted into corresponding modulated light for retransmission through fiber optic cables to a receiving one of the terminals. The conversion of the modulated light to electrical signals and then back into modulated light energy, together with the electrical switching circuitry, requires the use of expensive components and/or restricts the potential bandwidth of the data communication system.

SUMMARY OF THE INVENTION

With this background of the invention in mind, it is therefore an object of this invention to provide an improved data communication switching network.

It is another object of the invention to provide an improved fiber optic switching system.

These and other objects of the invention are attained generally by providing an electro-optical beam steerer having a phase shifting medium comprising liquid crystal molecules, for splitting a light beam of light having a predetermined direction into a plurality of differently directed light beams.

In accordance with another feature of the invention a data communication system comprises: a plurality of fiber optic cables; and, a fiber optic switching system, comprising: a support structure for securing light emitting/light receiving ends of the plurality of fiber optic cables in predetermined positions; and, means for re-directing light emitted from the light emitting/light receiving end of one of the fiber optic cables to the light emitting/light receiving ends of more than one of the plurality of fiber optic cables. The re-directing means includes means for collimating and directing the light emitted from the end of one of the cables as a beam propagating along a predetermined direction and for re-directing the beam towards the end of another one of the cables selectively in accordance with an electrical control signal. More particularly, the re-directing means includes electro-optical phase shifting medium, preferably liquid crystal molecules.

With such arrangement, light emitted by any one of the cables is switched to one, or more, of the other cables without requiring intermediate conversion of the transmitted light data into electrical signals and then re-conversion of the electrical signal into light data. Thus, the information in the emitted light may be simultaneously transmitted to more that one receiver of the communication system.

BRIEF DESCRIPTION OF THE DRAWINGS

The aforementioned features and other advantages of the invention, as well as the invention itself, will be more fully understood from the following description read together with the accompanying drawings, in which.

DESCRIPTION OF THE PREFERRED EMBODIMENTS

Figure 1:
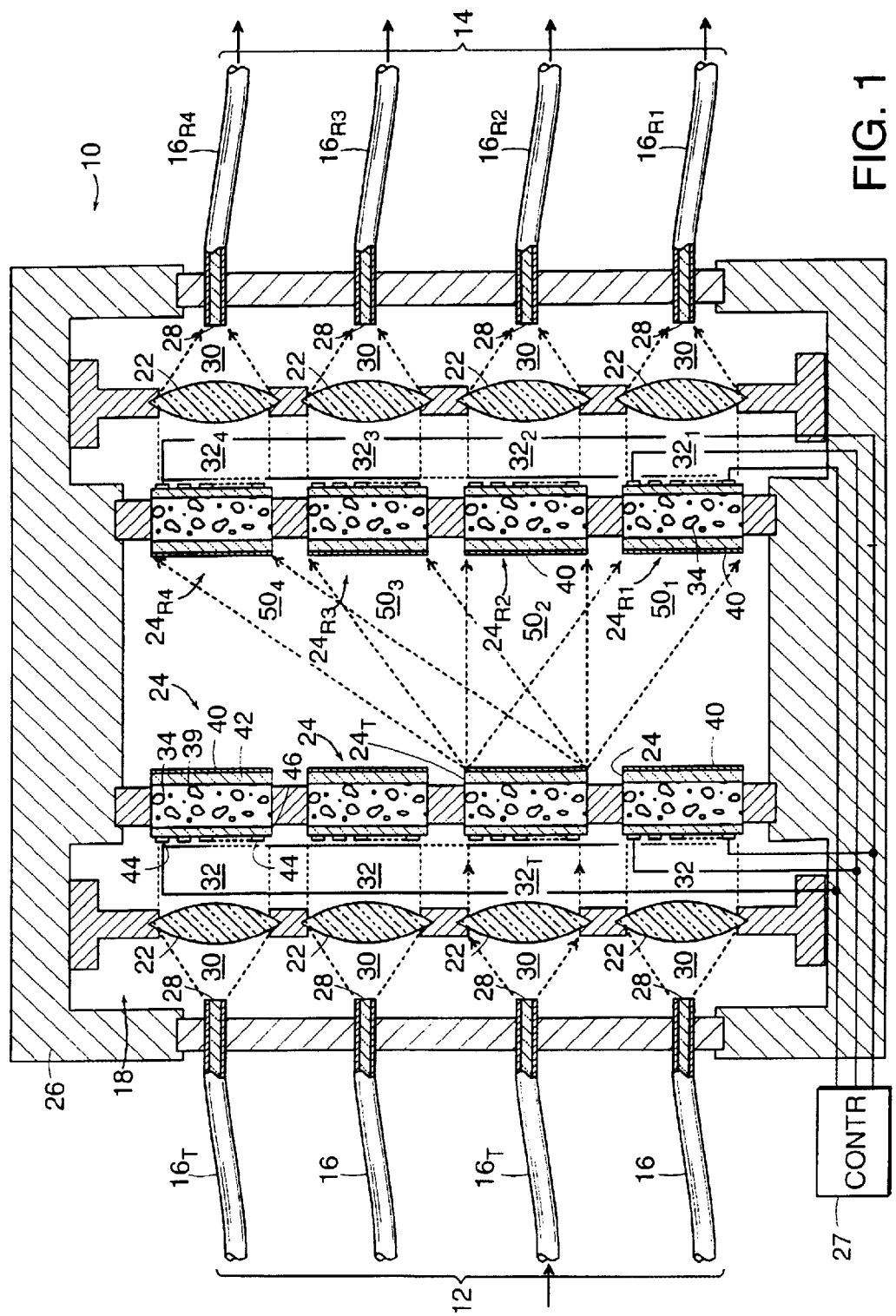
FIG. 1 is schematic diagram of a data communication system according to the invention.

Referring now to FIG. 1, a data communication system 10 is shown. Such system 10 includes two sets 12, 14 of fiber optic cables 16 and a fiber optic switching network 18. The switching network 18 includes: a plurality of collimating lenses 22; a plurality of beam steerers 24; a support structure 26 for securing light emitting/light receiving ends 28 of the plurality of fiber optic cables 16 in predetermined positions, for securing each one of the plurality of collimating lenses 22 in a predetermined position relative to a corresponding one of the fiber optic cables 16, and for securing each one of the beam steerers 24 in a predetermined position relative to a corresponding one of the fiber optic cables 16, as shown; and, a controller 27 for providing electrical control signals to the beam steerers 24. Thus, the supporting structure 26 positions the light emitting/light receiving end 28 of the fiber optic cable 16 along the optic axis of a corresponding collimating lens 22 and the optic axis of such lens 22 normal, and centrally disposed, to the beam intercepting surface of a corresponding beam steerer 24, as shown.

In operation, the divergent beam 30 of modulated light emitted at the terminal, or light emitting/light receiving, end 28 of a fiber optic cable 16 is collimated and directed as a collimated beam 32 of modulated light along the optic axis of the corresponding lens 22. The corresponding beam steerer 24 intercepts the collimated beam 32 and directs the intercepted collimated beam 32 to one, or more of the other fiber optic cables 16 selectively in accordance with the electrical control signals supplied to the beam steerers 24 by controller 27. Therefore, modulated light transmitted by any one, or more than one, of the cables 16 in set 12 can be directed to any one, or more than one, of the fiber optic cables 16 in set 14 by electrical control signals fed to the beam steerers 24 by controller 27. Likewise, by principles of reciprocity, modulated light transmitted by any one of the cables 16 in set 14 can be directed to any one, or more than one, of the fiber optic cables 16 in set 12 by electrical control signals fed to the beam steerers 24 by controller 27. That is, the light emitted from the light emitting/light receiving end 28 of one of the fiber optic cables 16 in set 12, say cable $16_T$, for example, is directed to the light emitting/light receiving end, or ends, 28 of one, or more than one, of the plurality of fiber optic cables 16 in set 14, say cable $16_{R1}$, $16_{R3}$, $16_{R4}$, for example, selectively in accordance with an electrical control signal fed to the switching system 18, (i.e., the beam steerers $24_T$, $24_{R1}$, $24_{R3}$, $24_{R4}$, corresponding to fiber optic cables $16_T$, $16_{R1}$, $16_{R3}$, $16_{R4}$ respectively, as shown) by controller 27. In this way, information transmitted via one of the cables 16 in set 12 may be sent simultaneously to one, or more than, receiver, not shown, coupled to the plurality of cables 16 in set 14.

Thus, if the number of cables 16 in set 14 is N, then each one of the beam steerers 32 is adapted to produce up to $(2^N)-1$ beam patterns. Thus, here N=4 and thus beam steerer $24_T$, for example, is adapted to produce 15 different beam patterns.

By principles of reciprocity, the light emitted from the light emitting/light receiving end, or ends, 28 of one, or more than one, of the fiber optic cable $16_R$ in set 14 is directed to the light emitting/light receiving end 28 to the light emitting/light receiving end 28 of fiber optic cable $16_T$ in set 12. Thus, in the general case, information can be transmitted and received between fiber optic cables 16 in set 12 and fiber optic cables 16 in set 14.

Each one of the beam steerers 24 includes electro-optical phase shifting medium, preferably liquid crystal molecules. Here, such beam steerer 24 includes a plurality of liquid crystal devices 34, arranged as shown in fixed relationship to the collimating lenses 22 by support structure 26. Here, each one of the liquid crystal devices 34 is of the type described in the following U.S. Patents: U.S. Pat. No. 5,093,747, "Method For Providing Beam Steering in a Subaperture-Addressed Optical Beam Steerer", issued Mar. 3, 1993, inventor Terry A. Dorschner; U.S. Pat. No. 4,964,701, "Deflector for an Optical Beam" inventors Terry A. Dorschner et al; and, U.S. Pat. No. 5,018,835, "Deflector for an Optical Beam Using Refractive Means", issued May 23, 1991, inventor Terry A. Dorschner, all assigned to the same assignee as the present invention, such patents being incorporated herein by reference. As described in the aforementioned U.S. Pat. No. 5,018,835, a liquid crystal device 34 having a common electrode 40 on a first window 42 and a multiplicity of parallel stripe electrodes 44 on a second window 46 provides an optical beam phase shifter, here beam steerer 24. A multiplicity of electrical control signals, here supplied by controller 27, is applied between individual stripe electrodes 44. A reference potential, not shown is applied to the common electrode 40. The voltages applied to the stripe electrodes 44 thereby create local variations of the liquid crystal material 39, here E-7 sold by British Drug House, or PTTP-33 which variations cause differential phase shifts across the cross section of the collimated light beam 32 incident thereon. The molecules of the liquid crystal material 39 are long, thin, rod-like organic molecules of the so-called "nematic" phase. As described in the aforementioned U.S. Pat. No. 5,093,747, when voltages are applied to the stripe electrodes 44 the index of refraction of the liquid crystal material 39 will depend on the level of the voltage applied. The phase shift of the exiting collimated beam 50, relative to that of the incident collimated beam 32, will vary spatially to thereby define the direction of the exiting beam 50. The direction, or directions of the beam, or beams, is a function of the spatial distribution of the indices of refraction provided to the incoming beam, as described in "High-Efficiency In-Line Multiple Imaging By Means of Multiple Phase Holograms" by H. Dammann and K. Gortler, Optics Communications, July 1973, Volume 3, Number 31, pages 312–315, and "Design of binary-phase and multiphase Fourier gratings for array generation" by Joseph N. Mait, Journal of the Optical Society of America (J. Opt. Am. A.) Volume 7, Number 7, August 1990, pages 1514–1528. The spatial distribution of the indices of fraction provided to the incoming beam are established with electrode voltages to direct the exiting beam 50 in the desired angular direction. The beam 32 incident on the liquid crystal device 34, (i.e., beam steerer $24_T$, for example) is steered in a vertical direction and exits as beams in accordance with the following Table:

| Beam(s) | Beam Directed by Beam Steerer $24_T$ to Beam Steerer(s) |
| --- | --- |
| $50_4$ | $24_{R4}$ |
| $50_3$ | $24_{R3}$ |
| $50_2$ | $24_{R2}$ |
| $50_1$ | $24_{R1}$ |
| $50_4$ and $50_3$ | $24_{R4}$ and $24_{R3}$ |
| $50_4$ and $50_2$ | $24_{R4}$ and $24_{R2}$ |
| $50_4$ and $50_1$ | $24_{R4}$ and $24_{R1}$ |
| $50_3$ and $50_2$ | $24_{R3}$ and $24_{R2}$ |
| $50_3$ and $50_1$ | $24_{R3}$ and $24_{R1}$ |
| $50_2$ and $50_1$ | $24_{R2}$ and $24_{R1}$ |
| $50_4$, $50_3$, and $50_2$ | $24_{R4}$, $24_{R3}$, and $24_{R2}$ |
| $50_4$, $50_2$, and $50_1$ | $24_{R4}$, $24_{R2}$, and $24_{R1}$ |
| $50_4$, $50_3$, and $50_1$ | $24_{R4}$, $24_{R3}$, and $24_{R1}$ |
| $50_4$, $50_3$, $50_2$, and $50_1$ | $24_{R4}$, $24_{R3}$, $24_{R2}$, and $24_{R1}$ |

It follows then that for each one of the beam steerers 32, there is a set of 15 electrical control signals. Each one of the electrical control signals in the set is distributed across the electrodes of the beam steerer to produce one of the 15 beam patterns described in the Table above. The sets of 15 electrical control signals for each of the, here 8 beam steerers 32, are stored as look-up tables in the controller 27. (It should be understood that if the controller signal across the beam steerer 24 produces uniform voltages to the stripe electrodes 44 of the beam steerer 24, the beam incident thereon passes through the beam steerer 24 without any angular deflection).

Figure 2:
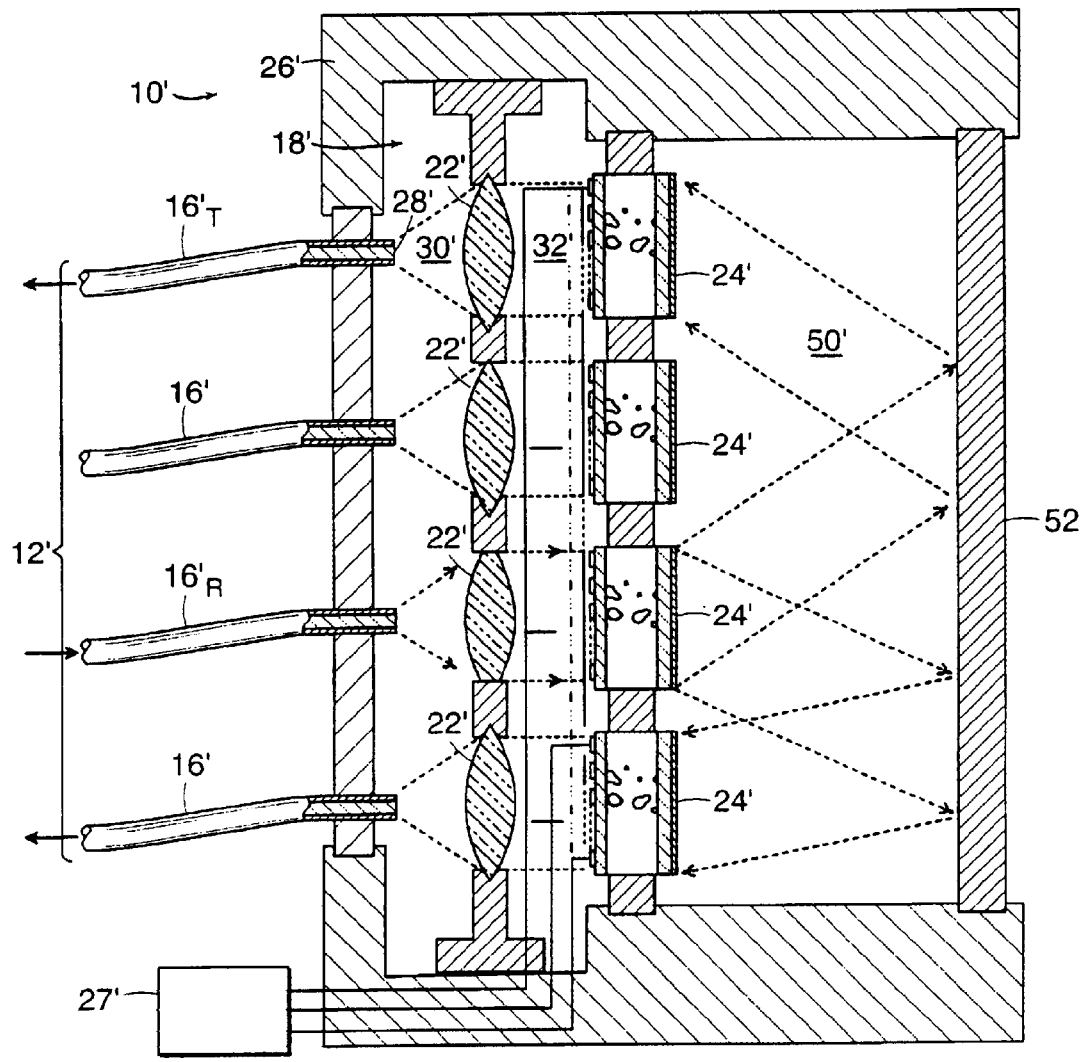
FIG. 2 is a schematic diagram of a data communication system according to an alternative of the invention.

Referring now to FIG. 2, a data communication system 10' is shown. Here, equivalent elements of the communication system 10 are designated in FIG. 2 by a prime (') notation. Here, system 10' includes only one set 12' of a plurality of fiber optic cables 16'. The switching network 18' includes a support structure 26', for securing light emitting/light receiving ends 28' of the plurality of fiber optic cables 16' in predetermined positions, as shown. Each one of a plurality of collimating lenses 22' is also secured in a predetermined position relative to a corresponding one of the fiber optic cables 16' by support structure 26'. More specifically, the divergent beam 30', of modulated light emitted at the terminal, or light transmitting/light receiving end 28' of a fiber optic cable 16' is collimated and directed as a collimated beam 32' of modulated light along the optic axis of the lens 22'. A beam steerer 24' is provided to direct the collimated beam 32' produced from light emitted by one of the fiber optic cables 16' to another one of the fiber optic cables 16' in the set 12'. That is, the light emitted from the light emitting/light receiving end 28' of one of the fiber optic cables 16' in set 12', say cable $16'_T$ is angularly deflected, in accordance with an electrical signal fed to switching network 18' by controller 27', to the reflective surface of a mirror 52. The exiting beam 50' is, after reflection by the mirror 52, passed to the light emitting/light receiving end 28' of another one of the plurality of fiber optic cables 16' in set 12', say 16'$_R$, as shown. Again, principles of reciprocity apply. Thus, data can be coupled between one of the cables 16 and another one of the cables 16 selectively in accordance with the electrical control signals provided to beam steerers 24' by controller 27'.

Figure 3:
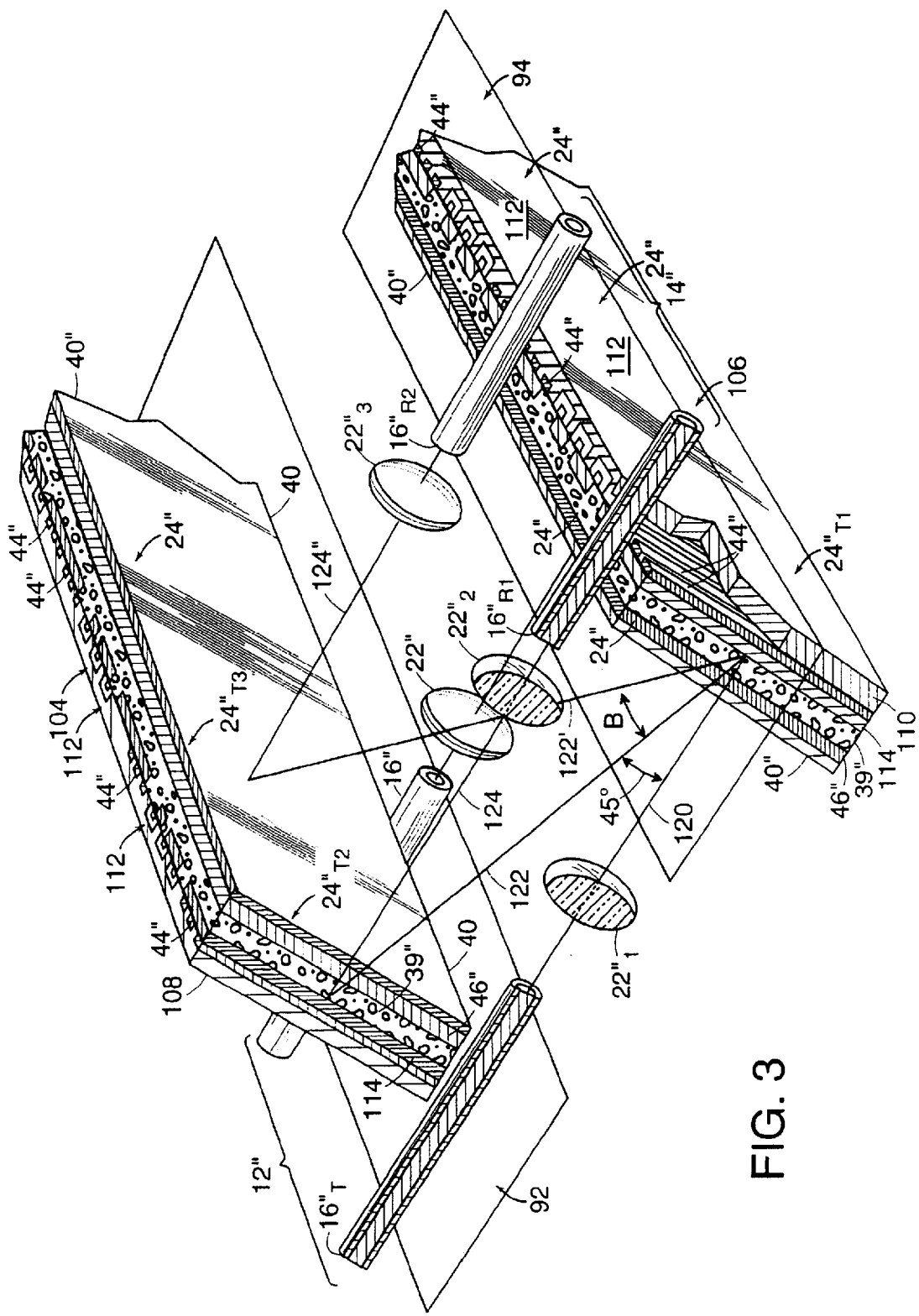
FIG. 3 is a schematic diagram of a data communication system according to an another alternative embodiment of the invention.
Figure 4:
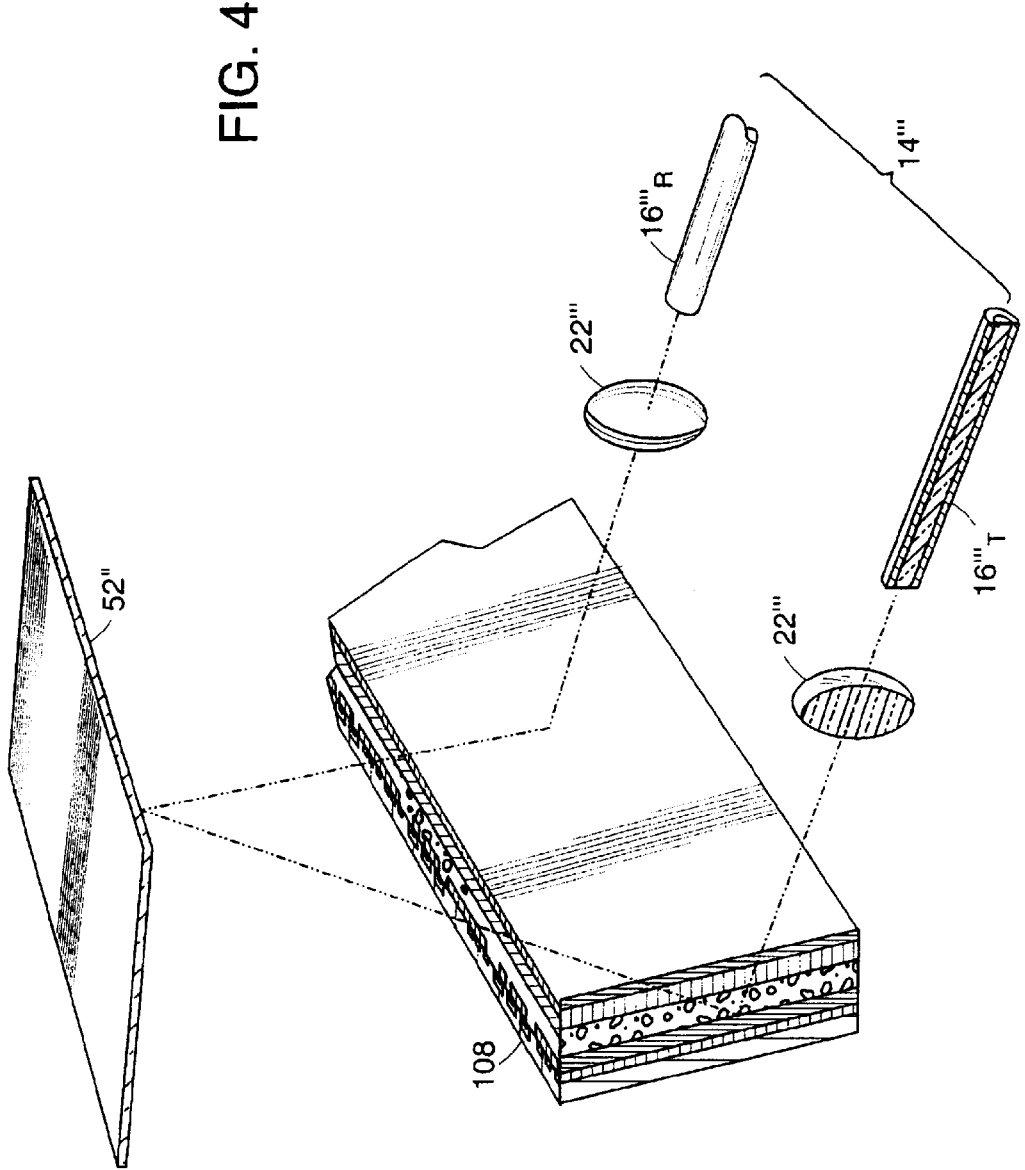
FIG. 4 is a schematic diagram of a data communication system according to an another alternative embodiment of the invention.

As described in U.S. Pat. No. 5,018,835, the beam steerer 24 may be transmissive to incident light, as shown in FIG. 1, or it may be reflective to incident light as shown in FIGS. 3 and 4. Thus, referring to FIG. 3, it is first noted that the support structure is not shown, for simplicity. It is next noted that a double prime (") designation is used to indicate elements equivalent to those used in connection with FIGS. 1 and 2. Thus, a first plurality of laterally displaced fiber optic cables 16" in set 12" is disposed in a first horizontal plane 92, and a second set 14" of fiber optic cables 16" in set 14" is disposed in a second horizontal plane 94; the second plane 94 being parallel to, and vertically positioned above, the first plane 92, as shown. Further, a first set 104 and second set 106 of beam steerers 24" are formed as reflective liquid crystal devices. Here, the beam steerers 24" in the first set 104 and second set 106 are identical in construction and are formed on a separate semiconductor substrate 108, 110, here silicon or gallium arsenide, respectively, as shown. Thus, the substrates 108, 110 each have a plurality of sets of conductor stripe electrodes 44" formed thereon. Each set 24" of stripe electrodes 44" corresponds to one of the beam steerers 24 of FIG. 1. Between each set of stripe electrodes 44", is a region 112. Region 112 has formed therein integrated circuits for supplying control signals to the adjacent set of stripe electrodes 44" of the adjacent one of the beam steerers 24". Disposed on the substrates 108, 110 over each set of stripe electrodes 44" is a reflective surface 114. Between the substrates 108, 110 and transparent opposing window 46" is the liquid crystal material 39". Disposed over the window 46" are transparent common conductors 40".

Thus, considering for example, cable 16"$_T$, diverging light emitted therefrom passes through the corresponding collimating lens 22$_1$ along axis 120. The light collimated by lens 22$_1$ is intercepted by reflecting surface 114 of the beam steerers 24"$_{T1}$. The planar reflecting surface 114 of the beam steerers 24" on substrate 110 is tilted upwardly 112.5 degrees with respect to the horizontal plane 92 towards the planar reflecting surface 114 of the beam steerers 24" on substrate 108. (Thus, the perpendicular, or normal, to the plane of the reflecting surface 114 is at a 22.5 degree angle with respect to axis 120). The planar reflecting surface 114 of the beam steerers 24" on substrate 108 is tilted downward 112.5 degrees with respect to the horizontal plane 94 towards the planar reflecting surface 114 of the beam steerers 24" on substrate 110. Thus, the planar surfaces 114 of the beam steerers 24" on substrate 108 is parallel to the planar reflecting surface 114 of the beam steerers 24" on substrate 110.

Here, consider first the condition when the control signal fed to the beam steerers 24" produces a uniform voltage distribution across the vertical stripe electrodes 44" of the beam steerers 24" (i.e., the case where the beam steerer 24" does not provide any horizontal, or lateral, angular beam deflection). Thus, because of the angular tilt of the planar reflecting surface 114 of beam steerer 24"$_{T1}$ on substrate 108, relative to the plane 92, the intercepted beam is re-directed upward along axis 122, such axis 122 being at an angle 45 degree angle with respect to the axis 120, toward beam steerer 24"$_{T2}$. The beam is next intercepted by reflecting surface 114 of beam steerer 24"$_{T2}$ formed on substrate 108. Because of the angular tilt of the planar reflective surface 114 of such beam steerer 24"$_{T2}$, the intercepted beam is directed along axis 124 through lens 22"$_2$ fiber optic cable 16"$_{R1}$, where axis 124 is parallel to, and disposed vertically above, axis 120. On the other hand, with a control signal fed to beam steerer 24"$_{T1}$ which causes an horizontal, or lateral, angular deflection to the beam incident thereon (i.e., the beam passing along axis 120), is deflected laterally at angle B relative to axis 120. Thus, in addition to its inherent (i.e., geometrically produced) vertical 45 degree vertical deflection, such beam is deflected to one of the laterally disposed beam steerers 24" in the second set thereof, say, for example along axis 122' to laterally displaced beam steerer 24"$_{T3}$. In such case the light intercepted by the reflective surface 114 of beam steerer 24"$_{T3}$ is directed along axis 124" through lens 22"$_3$, to fiber optic cable 16"$_{R2}$ (axis 124" is parallel to but laterally displaced from axis 124). Again, principles of reciprocity apply so that information may be transmitted and received between the fiber optic cables 16" in set 12" and the fiber optic cables 16" in set 14" is shown.

Referring to FIG. 4, an arrangement using the reflective beam steerers 24"' of FIG. 3, but with only one set of fiber optic cables 16"', here set 14"', similar to the arrangement discussed above in connection with FIG. 2, as shown. Here, the reflecting surface of the beam steerers on substrate 108 is at a 45 degree angle with respect to the horizontal plane, as in FIG. 2, but the mirror 52" is parallel to the horizontal plane.

Having described preferred embodiments of the invention, it will now become readily apparent to one of skill in the art that other embodiments incorporating its concepts may be made. For example, in addition to electronically steering laser beams, liquid crystal phased arrays may be used to steer in multiple directions simultaneously. This capability may be used to provide electronically programmable branching trees for fiber optic communications. Two dimensional arrays of liquid crystal devices 34 with electronic addressing for both beam steering and simultaneous direction steering may be used in optical computing applications. The invention may be used in any system that requires the switching of optical signals. Large two dimensional areas of liquid crystal devices 34 may be useful for optical computing, as mentioned above, especially in image processing applications. It is felt, therefore, that the invention should not be restricted to the described embodiments, but rather should be limited only by the spirit and scope of appended claims.

What is claimed is:

1. A fiber optic switching system, comprising:

a plurality of fiber optic cables;

a support structure for securing light emitting/light receiving ends of the plurality of fiber optic cables in predetermined positions;

means for selectively steering light emitted from the light emitting/light receiving end of one of the fiber optic cables simultaneously to the light emitting/light receiving ends of more than one of the plurality of fiber optic cables, the selectively steering means comprising means for collimating and directing the light emitted from the end of one of the cables as a beam propagating along a predetermined direction and means for changing the index of refraction of a liquid crystal material for providing a plurality of beam steering positions for steering the beam towards the ends of more than one of said plurality of fiber optic cables selectively in accordance with an electrical signal; and a substrate;

a plurality of receiving electro-optical phase shifting media disposed on such substrate, each one of the receiving electro-optical phase shifting media intercepting a corresponding one of the beams steered simultaneously to the light emitting/light receiving ends of more than one of the plurality of fiber optic cables.

2. The system recited in claim 1 wherein the steering means includes electro-optical phase shifting medium.

3. The system recited in claim 2 wherein the phase shifting medium comprises liquid crystal molecules.

4. A switching system, for coupling information propagating as electromagnetic wave energy between selected ones of a plurality of terminals having a predetermined spatial relationship, each one of such terminals being adapted to transmit said wave energy and receive said transmitted wave energy, said system comprising:

means, responsive to an electrical signal and positioned to receive the wave energy transmitted from one of the terminals, for changing the index of refraction of said means for providing a plurality of beam steering positions as said received wave energy passes through said means and for selectively steering simultaneously said received energy to a plurality of the spaced terminals selectively in accordance with the electrical signal;

a substrate;

a plurality of receiving electro-optical phase shifting media disposed on such substrate, each one of the receiving electro-optical phase shifting media intercepting a corresponding one of the simultaneously steered received energy as such simultaneously steered received energy passes to the to a plurality of the spaced terminals.

5. The system recited in claim 4 wherein the providing means includes means for collimating and directing the light emitted from the end of one of the terminals as a beam propagating along a predetermined direction and for steering the beam towards the ends of the terminals selectively in accordance with an electrical signal.

6. The system recited in claim 5 wherein the providing means comprises liquid crystal molecules.

7. A system for coupling information propagating in a beam of electromagnetic wave energy between selected ones of a plurality of cables having a predetermined spatial relationship, each one of such cables being adapted to transmit said wave energy and receive said transmitted wave energy, said system comprising:

means, responsive to an electrical signal and positioned to intercept the beam of wave energy emanating from one of the cables, for changing the index of refraction of a liquid crystal material for providing a plurality of beam steering positions for simultaneously steering said intercepted beam to a plurality of the spaced cables selectively in accordance with the electrical signal;

a substrate;

a plurality of receiving electro-optical phase shifting media disposed on such substrate, each one of the receiving electro-optical phase shifting media intercepting a corresponding one of the beams steered simultaneously to the spaced cables.

8. The system recited in claim 7 wherein the index of refraction changing means includes means for collimating and directing the light emitted from the end of one of the cables as a beam propagating along a predetermined direction and for selectively steering the beam towards the end of another one of the cables selectively in accordance with an electrical signal.

9. The system recited in claim 8 wherein the index of refraction changing means includes means includes electro-optical phase shifting medium.

10. The system recited in claim 9 wherein the phase shifting medium comprises liquid crystal molecules.

11. A fiber optic switching system, comprising:

a plurality of fiber optic cables;

a support structure for securing light emitting/light receiving ends of the plurality of fiber optic cables in predetermined positions; and means for re-directing light emitted from the light emitting/light receiving end of one of the fiber optic cables to the light emitting/light receiving end of another one of the plurality of fiber optic cables; said redirecting means comprising;

means for collimating the light emitted from one of the light emitting/light receiving ends for providing a collimated beam having a path with a direction;

first means, comprising a plurality of first phase shifting regions disposed on a first common substrate, for intercepting and changing the direction of the path of the collimated beam;

second means, comprising a plurality of second phase shifting regions disposed on a second common substrate, disposed in the path of the collimated beam from the first intercepting and changing means, for intercepting and changing the direction of the path of the collimated beam; and means, disposed in the path of the collimated beam from the second intercepting and changing means, for focusing the collimated beam to the light emitting/light receiving end of another one of the plurality of fiber optic cables.

12. The system recited in claim 11 wherein the collimating means comprises a collimating lens.

13. The system recited in claim 12 wherein the first and second intercepting and changing means each comprises an optical beam phase shifter.

14. The system recited in claim 13 wherein the optical beam phase shifter comprises liquid crystal molecules disposed between a common electrode and a multiplicity of parallel stripe electrodes.

15. The system recited in claim 11 wherein the first common substrate is a semiconductor substrate and the second common substrate is a semiconductor substrate.

16. A switching system, for coupling information propagating as electromagnetic wave energy between selected ones of a plurality of terminals having a predetermined spatial relationship, each one of such terminals being adapted to transmit said wave energy and receive said transmitted wave energy, said system comprising:

means, responsive to an electrical signal and positioned to receive the wave energy transmitted at one of the terminals, for changing the index of refraction of said means as said received wave energy passes through said means to direct said received energy to another one of the spaced terminals selectively in accordance with the electrical signal; and means for collimating the wave energy emitted from an end of one of the terminals for providing a collimated beam having a path with a direction; and said index of refraction changing means comprising:
first means, comprising a plurality of first phase shifting regions disposed on a first common substrate, for intercepting and changing the direction of the path of the collimated beam comprising an optical beam phase shifter; and
second means, comprising a plurality of second phase shifting regions disposed on a second common substrate, disposed in the path of the collimated beam from the first intercepting and changing means, for intercepting and changing the direction of the path of the collimated beam comprising an optical beam phase shifter; and
means, disposed in the path of the collimated beam from the second intercepting and changing means, for focusing the collimated beam to the another one of the terminals.

17. The system recited in claim 16 wherein the optical beam phase shifter comprises liquid crystal molecules disposed between a common electrode and a multiplicity of parallel stripe electrodes.

18. The system recited in claim 16 wherein the first common substrate is a semiconductor substrate and the second common substrate is a semiconductor substrate.

19. A system for coupling information propagating in a beam of electromagnetic wave energy between selected ones of a plurality of terminals having a predetermined spatial relationship, each one of such terminals being adapted to transmit said wave energy and receive said transmitted wave energy, said system comprising:
means, responsive to an electrical signal and positioned to intercept the beam of wave energy emanating from one of the terminals, for re-directing said intercepted beam to another one of the spaced terminals selectively in accordance with the electrical signal, said redirecting means comprising:
means for collimating the wave energy emitted from one of the terminals for providing a collimated beam having a path with a direction;
first means, comprising a plurality of first phase shifting regions disposed on a first common substrate, for intercepting and changing the direction of the path of the collimated beam;
second means, comprising a plurality of second phase shifting regions disposed on a second common substrate, disposed in the path of the collimated beam from the first intercepting and changing means, for intercepting and changing the direction of the path of the collimated beam; and
means, disposed in the path of the collimated beam from the second intercepting and changing means, for focusing the collimated beam to another one of the terminals.

20. The system recited in claim 19 wherein the collimating means comprises a collimating lens.

21. The system recited in claim 20 wherein the first and second intercepting and changing means each comprises an optical beam phase shifter.

22. The system recited in claim 21 wherein the optical beam phase shifter comprises liquid crystal molecules disposed between a common electrode and a multiplicity of parallel stripe electrodes.

23. A system, comprising:
means for producing a beam of light and for directing such beam of light along a predetermined direction;
a first electro-optical phase shifting medium comprising liquid crystal molecules; and
a plurality of second electro-optical phase shifting media, each one comprising liquid crystal molecules; and
wherein the first electro-optical phase shifting medium includes a plurality of electrodes having a voltage distribution selected to split such beam of produced light into a plurality of differently directed light beams, each one of such differently directed beams being directed by such voltage distribution to a corresponding one of the plurality of second electro-optical phase shifting media.

24. The system recited in claim 23 wherein the phase shifting medium comprises a common electrode and wherein the common electrode and the plurality of electrodes are separated by the liquid crystal molecules.

25. The system recited in claim 23 wherein the voltage distribution produces such plurality of beams simultaneously.

26. The system recited in claim 23 including a common substrate and wherein the plurality of second electro-optical phase shifting media is disposed on the common substrate.

27. The system recited in claim 26 wherein the substrate is a semiconductor substrate.

28. The system recited in claim 25 including a common substrate and wherein the plurality of second electro-optical phase shifting media is disposed on the common substrate.

29. The system recited in claim 28 wherein the substrate is a semiconductor substrate.

30. A system, comprising:
means for producing a beam of light and for directing such beam of light along a predetermined direction;
a first electro-optical phase shifting medium comprising liquid crystal molecules; and
a plurality of second electro-optical phase shifting media, each one comprising liquid crystal molecules; and
wherein the first electro-optical phase shifting medium includes a plurality of electrodes having a selected one of a plurality of voltage distributions selected to direct such beam of produced light along a corresponding one of a plurality of different directions, each one of the different directions being from the first electro-optical phase shifting medium to a corresponding one of the plurality of second electro-optical phase shifting media.

31. The system recited in claim 30 wherein the phase shifting medium comprises a common electrode and wherein the common electrode and the plurality of electrodes are separated by the liquid crystal molecules.

32. The system recited in claim 31 wherein the voltage distribution produces such plurality of beams simultaneously.

33. The system recited in claim 30 including a common substrate and wherein the plurality of second electro-optical phase shifting media is disposed on the common substrate.

34. The system recited in claim 33 wherein the substrate is a semiconductor substrate.

35. The system recited in claim 32 including a common substrate and wherein the plurality of second electro-optical phase shifting media is disposed on the common substrate.

36. The system recited in claim 35 wherein the substrate is a semiconductor substrate.

37. A system, comprising:
means for producing a beam of light and for directing such beam of light along a predetermined direction;
a first electro-optical phase shifting medium comprising liquid crystal molecules; and
a plurality of second electro-optical phase shifting media, each one comprising liquid crystal molecules; and wherein the first electro-optical phase shifting medium includes a plurality of electrodes having a selected one of a plurality of voltage distributions selected to direct such beam of produced light along at least one of a corresponding plurality of different directions, each one of the different directions being from the first electro-optical phase shifting medium to a corresponding one of the plurality of second electro-optical phase shifting media.

38. The system recited in claim 37 wherein the phase shifting medium comprises a common electrode and wherein the common electrode and the plurality of electrodes are separated by the liquid crystal molecules.

39. The system recited in claim 37 wherein the voltage distribution produces such plurality of beams simultaneously.

40. The system recited in claim 37 including a common substrate and wherein the plurality of second electro-optical phase shifting media is disposed on the common substrate.

41. The system recited in claim 40 wherein the substrate is a semiconductor substrate.

* * * * *

UNITED STATES PATENT AND TRADEMARK OFFICE
CERTIFICATE OF CORRECTION

| | |
|---|---|
| PATENT NO. | : 6,704,474 B1 |
| APPLICATION NO. | : 10/215268 |
| DATED | : March 9, 2004 |
| INVENTOR(S) | : Dorschner et al. |

It is certified that error appears in the above-identified patent and that said Letters Patent is hereby corrected as shown below:

Title Page (57)
Abstract, line 7, delete "ends" and replace with --end--.

Title Page (57)
Abstract, line 8, delete "of a plurality of the plurality" and replace with --of the plurality--.

Col. 1, line 54, delete "invention a data" and replace with --invention, a data--.

Col. 2, line 18, delete "FIG. 1 is schematic" and replace with --FIG. 1 is a schematic--.

Col. 3, line 12, delete ", or more than," and replace with --, or more than one,--.

Col. 3, line 38, delete "Beam" inventors" and replace with --Beam", issued Oct. 23, 1990, inventors--.

Col. 3, line 60, delete "electrodes 44 the index" and replace with --electrodes 44, the index--.

Col. 5, line 67, delete "angle 45 degree angle" and replace with --45 degree angle--.

Col. 6, line 5, delete "22"$_2$ fiber optic" and replace with --22"$_2$ to fiber optic--.

Col. 6, line 22, delete "is shown" and replace with --as shown--.

Col. 7, line 36, delete "to the to a plurality" and replace with --to the plurality--.

UNITED STATES PATENT AND TRADEMARK OFFICE
CERTIFICATE OF CORRECTION

PATENT NO. : 6,704,474 B1
APPLICATION NO. : 10/215268
DATED : March 9, 2004
INVENTOR(S) : Dorschner et al.

It is certified that error appears in the above-identified patent and that said Letters Patent is hereby corrected as shown below:

Col. 8, line 6, delete "means includes means includes" and replace with --means includes--.

Signed and Sealed this

Tenth Day of April, 2007

JON W. DUDAS
*Director of the United States Patent and Trademark Office*